(12) United States Patent
Boneberg et al.

(10) Patent No.: US 6,277,339 B1
(45) Date of Patent: Aug. 21, 2001

(54) REFORMING REACTOR WITH CATALYTIC BURNER UNIT

(75) Inventors: Stefan Boneberg, Blaustein; Stefan Brauchle, Biberach/Riss, both of (DE)

(73) Assignee: Xcellsis GmbH, Kirchheim/Tech-Nabern (DE)

(*) Notice: Subject to any disclaimer, the term of this patent is extended or adjusted under 35 U.S.C. 154(b) by 0 days.

(21) Appl. No.: 09/356,498

(22) Filed: Jul. 19, 1999

(30) Foreign Application Priority Data

Jul. 18, 1998 (DE) .............................. 198 32 386

(51) Int. Cl.$^7$ ....................................... B01J 8/04
(52) U.S. Cl. .................... 422/198; 422/188; 422/189; 422/193
(58) Field of Search ................... 48/61; 422/188, 422/189, 190, 191, 193, 194, 198, 211; 423/248

(56) References Cited

U.S. PATENT DOCUMENTS 5,071,627 12/1991 Child et al. ...................... 422/196

FOREIGN PATENT DOCUMENTS

| 29 42 359 | 6/1980 | (DE) . |
|---|---|---|
| 43 30 623 | 3/1994 | (DE) . |
| 0 199 878 A2 | 11/1984 | (EP) . |
| 0 529 329 A2 | 3/1993 | (EP) . |
| 0 600 621 | 6/1994 | (EP) . |
| 922 666 A1 | * 1/1998 | (EP) . |
| 0 887 307 | 12/1998 | (EP) . |
| WO98/00361 | * 1/1998 | (JP) . |

* cited by examiner

Primary Examiner—Hien Tran
Assistant Examiner—Frederick Varcoe
(74) Attorney, Agent, or Firm—Crowell & Moring, L.L.P.

(57) ABSTRACT

A reforming reactor includes (1) a reformer section for converting a starting material mixture into a reformate product by means of an endothermal reforming reaction; (2) a CO shift section to convert the carbon monoxide contained in the reformate product into carbon dioxide by the CO shift reaction; and (3) a catalytic burner unit for generating heat by catalytic combustion of a combustion gas. The catalytic burner has a heating area in thermal contact with the reformer section and a cooling area in thermal contact with the CO shift section having less combustion catalyst activity than the heating area. Combustion gas is fed counter-current-wise to the reformate product flowing through the CO shift stage and to the starting material mixture flowing through the reformer stage through the corresponding cooling area and through the adjoining heating area.

7 Claims, 1 Drawing Sheet

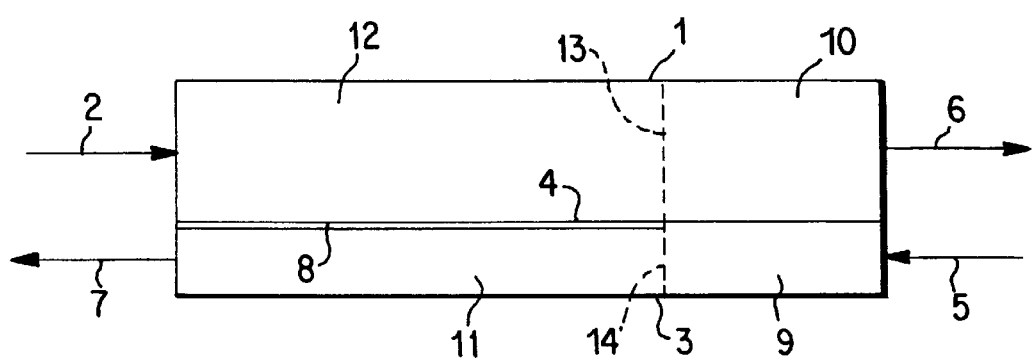

REFORMING REACTOR WITH CATALYTIC BURNER UNIT

BACKGROUND AND SUMMARY OF THE INVENTION

This application claims the priority of German Patent Application No. 198 32 386.7, filed Jul. 18, 1998, the disclosure of which is expressly incorporated by reference herein.

The present invention relates to a reforming reactor. The reactor contains (1) a reforming stage for converting a starting material mixture into a reformate product; (2) a CO shift stage to reduce the CO concentration in the reformate product; and (3) a catalytic burner unit. The catalytic burner unit is in thermal contact with the reformer stage by a heating area and is in thermal contact with the CO shift stage by a cooling area. In the cooling area, the burner unit has less catalyst activity than in the heating area. Preferably, the burner catalyst activity in the cooling area is equal to zero, because only the heating area is lined with a combustion catalyst material, while the cooling area remains catalyst-free. Such reactors are particularly suitable for steam reforming of methanol in a fuel cell vehicle in order to generate the hydrogen necessary for operating the fuel cells from liquid methanol carried on board.

Patent EP 0 529 329 B1 discloses a reforming reactor of this type in the plate stack design, which serves in particular for endothermal reforming of municipal gas. The reactor conducts the resulting hydrogen-rich reformate gas to a stationary phosphoric acid fuel cell system, as used in hotels, apartments, and hospitals. A heat exchange stage is provided between the reformer stage and the CO shift stage. In this heat exchange stage, the reformate gas leaving the reformer stage, before entering the CO shift stage, heats the municipal gas fed to the reformer stage while cooling. In the reformer stage, a reformer layer lined with a reforming catalytic material is in thermal contact with a heating layer of the burner unit, which is lined with combustion catalytic material. Air that has passed through a first catalyst-free cooling layer of the CO shift stage is fed to this heating layer. The fuel used for the catalytic burner unit is the anode output gas of the fuel cell system. The anode gas first passes through a second cooling layer of the CO shift stage and then is fed into a fuel supply layer of the reformer stage. The fuel supply layer is connected with the heating layer via a perforated plate which distributes the fuel evenly as it passes through its openings to the heating layer. The fuel is burned there with air that flows through the heating layer co-currently with the municipal gas fed through the reformer layer. In the CO shift stage, a CO conversion layer lined with suitable CO shift catalytic material, in which the exothermic CO shift reaction takes place, is in thermal contact with the first and second cooling layers adjacent on both sides. The air and the fuel cell anode output gas are separately fed through the cooling layers in a cross-current to the reformate gas flowing through the CO conversion layer.

In another reforming reactor, as disclosed in laid-open patent EP 0 199 878 A2, a tubular catalytic burner unit is provided that is surrounded annularly by a reformer stage, which transitions at an axial end area to a CO shift stage surrounding the reformer stage, likewise annularly. At a U-shaped inlet area, the CO shift stage adjoins the reformer stage separated therefrom by a gas-permeable partition. At its radially internal side, the U-shaped inlet area of the CO shift stage abuts an interior inlet area of the burner unit, which is upstream of its catalytically lined heating area and separated therefrom by a gas-permeable partition.

It is an object of the present invention to provide a reforming reactor that has a compact design, produces sufficiently CO-lean reformate product, and is also especially suitable for mobile applications, for example, in a fuel cell vehicle.

The present invention achieves this object by providing a reforming reactor in which the combustion gas, namely the combustible gas mixture for the catalytic burner unit, is fed counter-current-wise to (1) the reformate product flowing through the CO shift stage, thereby being in thermal contact over at least half the flow path length of the CO shift stage and/or over at least a part thereof on the outlet side (i.e., corresponding to a cooling area); and (2) the starting material mixture flowing through the reformer stage (i.e., corresponding to a heating area of the catalytic burner unit). To carry out its heating function, the heating area is lined with a combustion catalytic material which provides sufficient burner catalyst activity. On the other hand, the cooling area is designed with lower burner catalyst activity, and can be made for example without any catalyst lining, so that no heat of combustion is generated in this area.

This combustion gas feed according to the counter-current principle makes comparatively effective cooling of the CO shift stage possible, so that the CO shift stage and the reactor as a whole can be compact. This contributes to the combustion gas being fed through cooling area of the catalytic burner unit as a homogeneous cooling flow, namely the fuel and the oxygen-containing gas are already mixed. The counterflow of the combustion gas in the heating area in thermal contact with the reformer stage is advantageous for cold starting performance, as the intake side of the reformer stage is maximally heated when starting so that it rapidly reaches the operating temperature necessary for the reforming reaction. A high operating temperature in the reformer stage is desirable so that operation at high load is possible and a high reforming efficiency can be achieved with a compact design. The reformer stage output side, which is in thermal contact with the input side of the heating area due to the counter-current principle, is heated to a correspondingly lower degree. Thus, a desired temperature drop is introduced into the transition area to the CO shift stage, which shifts the equilibrium in the reformate product in the direction of a low CO percentage. Because of this, the CO concentration in the reformate product is brought to a sufficiently low value by the time it reaches the outlet of the CO shift stage, so that the CO shift reaction simultaneously increases the hydrogen yield and hence the total efficiency of the reactor. Because the CO concentration at the outlet of the CO shift stage is already relatively low, if a gas purification stage such as a CO oxidation stage is added downstream for further CO reduction, it does not have to have a particularly high performance and can therefore also be compact.

Another reforming reactor according to the present invention makes a particularly compact system design possible because the reformer stage and the CO shift stage are integrated into a common reaction chamber. The common reaction chamber is in thermal contact by an upstream part with the heating area of the catalytic burner unit and is in thermal contact by a downstream part with the cooling area of the catalytic burner unit. The upstream heated reaction chamber part forms the reformer stage and the downstream cooled reaction chamber part forms the CO shift stage. It must be understood that with this integral construction, the reforming function of the reformer stage makes a smooth transition to the CO reduction function of the CO shift stage.

In an embodiment of a reforming reactor according to the present invention, the cooling area and the heating area of the catalytic burner unit are integrated in a common combustion chamber. Integration of the reformer stage and CO shift stage in a common reaction chamber makes a particularly compact reactor design possible.

Other objects, advantages and novel features of the present invention will become apparent from the following detailed description of the invention when considered in conjunction with the accompanying drawing.

BRIEF DESCRIPTION OF THE DRAWING

The single FIGURE is a schematic lengthwise section through a reforming reactor.

DETAILED DESCRIPTION OF THE PREFERRED EMBODIMENT

The reforming reactor shown contains a reaction chamber 1 which is lined in a manner not shown in greater detail with a catalytic material, which catalyzes the intended reforming reaction of a starting material mixture 2 into a reformate product and at the same time is suitable as a CO shift catalyst. The reactor can be used especially in mobile applications such as in fuel cell vehicles, for hydrogen reforming of methanol or a methanol/water mixture as the starting material mixture 2 is fed into reaction chamber 1. Suitable catalytic materials for simultaneous temperature-dependent catalysis of the reforming reaction of methanol and the CO shift reaction are known and are provided, for example, in the form of a pellet charge or inner wall coating in reaction chamber 1.

Reaction chamber 1 is in flush thermal contact with a combustion chamber 3 of a catalytic burner unit by a partition 4. A combustion gas 5 to be burned catalytically is fed countercurrent-wise relative to the starting material mixture 2 fed into reaction chamber 1, into combustion chamber 3 so that combustion gas 5 impinges on the side of combustion chamber 3 at which the reformate product 6 produced by the reforming reaction leaves reaction chamber 1, while combustion gases 7 leave combustion chamber 3 on the opposite side to which the starting material mixture 2 is fed to reaction chamber 1. Combustion chamber 3 is lined, only in a downstream part 11, with a suitable combustion catalyst material 8 in the form of a wall coating on the corresponding side of partition 4, while the remaining upstream part 9 of combustion chamber 3 is free of catalyst material. Since no combustion takes place in this upstream part 9 of combustion chamber 3, upstream part 9 forms a cooling area through which combustion gas 5 flows as a cooling stream for the CO shift stage 10 of reaction chamber 1. On the other hand, downstream part 11 of combustion chamber 3 forms a heating area in which the supplied combustion gas is burned under the influence of combustion catalyst 8. The heat of combustion thus produced in downstream part 11 heats the adjacent upstream part of reformer stage 12.

The system design is chosen so that upstream part 12 of reaction chamber 1 forms a reformer stage, which is heated by downstream part 11 of the catalytic combustion unit to a higher temperature optimum for carrying out the reforming reaction. The adjacent downstream part 10 of reaction chamber 1 forms a CO shift stage, which is held by cooling area 9 of the combustion unit at a lower temperature than reformer stage 12. The lower temperature shifts the equilibrium of the CO shift reaction, so that in CO shift stage 10 the CO percentage in the formed reformate product is reduced and at the same time the reforming reaction can be completed, as long as not-yet-converted starting material mixture arrives in CO shift stage 10. Reformate product 6 thus leaves CO shift stage 10 and hence reaction chamber 1 with a high proportion of hydrogen and a sufficiently low CO concentration. Due to the shift in the shift gas equilibrium, the hydrogen yield increases as well, which favors the efficiency of the entire reactor. In the case of steam reforming of methanol, the reformate product 6, which consists essentially of hydrogen, is fed to the anode part of a fuel cell system as a fuel, and if necessary is subjected to further gas purification to reduce the CO (e.g., by a CO oxidation stage or selective hydrogen separation stage). Preferably, the burner unit itself can be designed as a CO oxidation stage, and in this case the reformate product is fed to the burner unit for CO reduction before entering the fuel cell system.

It will be understood that the reforming reactor shown has a very compact design, which takes up very little space with the required performance, and can be made light-weight, making it particularly suitable for mobile applications. The reformer stage 12 and CO shift stage 10 downstream are built into a common reaction chamber 1, resulting in a transition range shown as a dashed line in the FIGURE. The breadth of the transition area varies according to the system design, in which the reforming activity decreases in the gas flow direction and the CO shift conversion activity increases. This transition area 13 is defined by a transition area 14, also a dashed line, between the catalyst-free cooling area 9 and the catalyst-lined heating area 11 of combustion chamber 3.

Thus, the position and width of the transition area 13 between the reformer stage 12 and CO shift stage 10 can be adjusted as required by the design of the combustion chamber cooling area 9 and its transition 14 to heating area 11 as desired. As an alternative to the catalyst-free cooling area 9 in the FIGURE, it is possible to line the cooling area with a combustion catalyst material that is thinner than in adjoining heating area 11. In this way, the thin combustion catalyst lining in cooling area 9 can be uniform or inhomogeneous so that the combustion catalyst activity increases continuously in the direction of heating area 11.

The counter-current principle of the combustion gas stream 5 to reforming starting material mixture 2 is advantageous for cold starting performance. After a cold start, the part of combustion chamber 3 on the output side heats up fastest, as this part is additionally heated by the hot combustion gases 7 produced upstream. Thus, the corresponding part of reformer stage 12 on the inlet side very quickly reaches the operating temperature necessary for carrying out the reforming reaction and quickly starts the reforming process.

It will be understood that, in addition to the example described above, other embodiments of the reforming reactor according to the present invention are possible. The reformer stage and CO shift stage may contain different catalyst materials. Also, instead of the integrated system design shown, the reaction chambers of the reformer stage and the CO shift stage can be spatially separated from each other and connected by a connecting line. In similar fashion, heat transfer chambers that are spatially separated and linked by a connecting line can be associated with the cooling area and the heating area of the catalytic burner unit. It will be understood that the reactor need not have the plate design shown but can have any other normal design, particularly a tube bundle or a cylindrical design. In all cases, counter-current guidance of the combustion gas relative to the starting material mixture to be reformed is preserved with its aforementioned advantages, particularly achievement of a compact reactor design.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A reforming reactor, comprising:
    a reformer section for converting a starting material mixture into a reformate product by an endothermal reforming reaction;
    a CO shift section for converting carbon monoxide contained in the reformate product into carbon dioxide;
    a catalytic burner unit for heat generation by catalytic combustion of a combustion gas, wherein the catalytic burner unit comprises:
    a heating area in direct thermal contact with the reformer section, and
    a cooling area in thermal contact with the CO shift section and having less combustion catalyst activity than the heating area; and
    means for conducting a combustion gas through the cooling area and the heating area counter-current to the reformate product flowing through CO shift section and to the starting material mixture flowing through the reformer section.

2. A reforming reactor according to claim 1, wherein the starting material mixture comprises methanol.

3. A reforming reactor according to claim 1, wherein the cooling area is in thermal contact with the CO shift section over at least half a length of the CO shift section.

4. A reforming reactor according to claim 1, wherein the cooling area is in thermal contact with the CO shift section over at least a part of an outlet of the CO shift section.

5. A reforming reactor according to claim 1, wherein the reformer section forms an upstream part of a reaction chamber in which the CO shift section is integrated as a downstream part thereof.

6. A reforming reactor according to claim 1, wherein the cooling area forms an upstream part and the heating area forms a downstream part of a continuous combustion chamber of the catalytic burner unit.

7. A reforming reactor according to claim 1, wherein the catalytic burner unit is a section for selective CO oxidation of the reformate product.

* * * * *